US007748501B2

(12) United States Patent
Marler et al.

(10) Patent No.: US 7,748,501 B2
(45) Date of Patent: Jul. 6, 2010

(54) ELEVATOR SYSTEM DESIGN INCLUDING A BELT ASSEMBLY WITH A VIBRATION AND NOISE REDUCING GROOVE CONFIGURATION

(75) Inventors: Mark E. Marler, Glastonbury, CT (US); Xiaodong Luo, S. Windsor, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/501,659

(22) PCT Filed: Jan. 15, 2003

(86) PCT No.: PCT/US03/01148

§ 371 (c)(1),
(2), (4) Date: Jul. 14, 2004

(87) PCT Pub. No.: WO03/062117

PCT Pub. Date: Jul. 31, 2003

(65) Prior Publication Data

US 2005/0103573 A1 May 19, 2005

Related U.S. Application Data

(60) Provisional application No. 60/349,057, filed on Jan. 16, 2002.

(51) Int. Cl.
*B66B 11/08* (2006.01)
*F16G 9/00* (2006.01)

(52) U.S. Cl. ....................... 187/251; 187/254; 474/237; 474/260

(58) Field of Classification Search ................. 187/251, 187/254, 264; 474/260, 264, 237
See application file for complete search history.

(56) References Cited

U.S. PATENT DOCUMENTS 2,728,239 A * 12/1955 Adams, Jr. .................. 474/167

(Continued)

FOREIGN PATENT DOCUMENTS

JP 441140 4/1992

(Continued)

OTHER PUBLICATIONS

PCT International Search Report, Jun. 2, 2003.

(Continued)

*Primary Examiner*—John Q Nguyen
*Assistant Examiner*—Stefan Kruer
(74) *Attorney, Agent, or Firm*—Carlson, Gaskey & Olds PC

(57) ABSTRACT

An elevator system design incorporates a belt having a jacket coating a plurality of elongate load bearing members such as steel cords. The jacket includes a plurality of spaced grooves on at least one side of the belt. The width of the grooves and the size of at least the drive sheave in the system are selected so that a ratio of the groove width to the sheave diameter is within a selected range. In one example, the ratio preferably is less than about 0.05. The grooves also preferably include a fillet at the edges of the grooves where the grooves meet with the sheave-engaging surface on the belt jacket.

4 Claims, 3 Drawing Sheets

U.S. PATENT DOCUMENTS

| | | | | |
|---|---|---|---|---|
| 4,410,314 | A | 10/1983 | Miranti, Jr. et al. | |
| 4,647,278 | A * | 3/1987 | Hull | 474/205 |
| 4,722,722 | A | 2/1988 | Rampe | |
| 4,976,662 | A * | 12/1990 | Miranti, Jr. | 474/205 |
| 4,995,855 | A | 2/1991 | Hasebe et al. | |
| 5,308,291 | A | 5/1994 | Robertson et al. | |
| 6,199,666 | B1 * | 3/2001 | Aulanko et al. | 187/277 |
| 6,264,061 | B1 * | 7/2001 | Fukai et al. | 221/171 |
| 6,364,061 | B2 * | 4/2002 | Baranda et al. | 187/254 |
| 6,364,063 | B1 * | 4/2002 | Aulanko et al. | 187/266 |
| 6,419,208 | B1 * | 7/2002 | Baranda et al. | 254/390 |
| 7,670,240 | B2 * | 3/2010 | Pitts et al. | 474/237 |
| 2003/0069101 | A1 * | 4/2003 | Pitts et al. | 474/260 |

FOREIGN PATENT DOCUMENTS

| | | |
|---|---|---|
| JP | 4-345484 | 12/1992 |
| JP | 08247221 A * | 9/1996 |
| WO | 0037738 | 6/2000 |

OTHER PUBLICATIONS

Translation of Japanese Patent Office Action dated Oct. 28, 2008 for Patent Application No. 2003-562012.

* cited by examiner

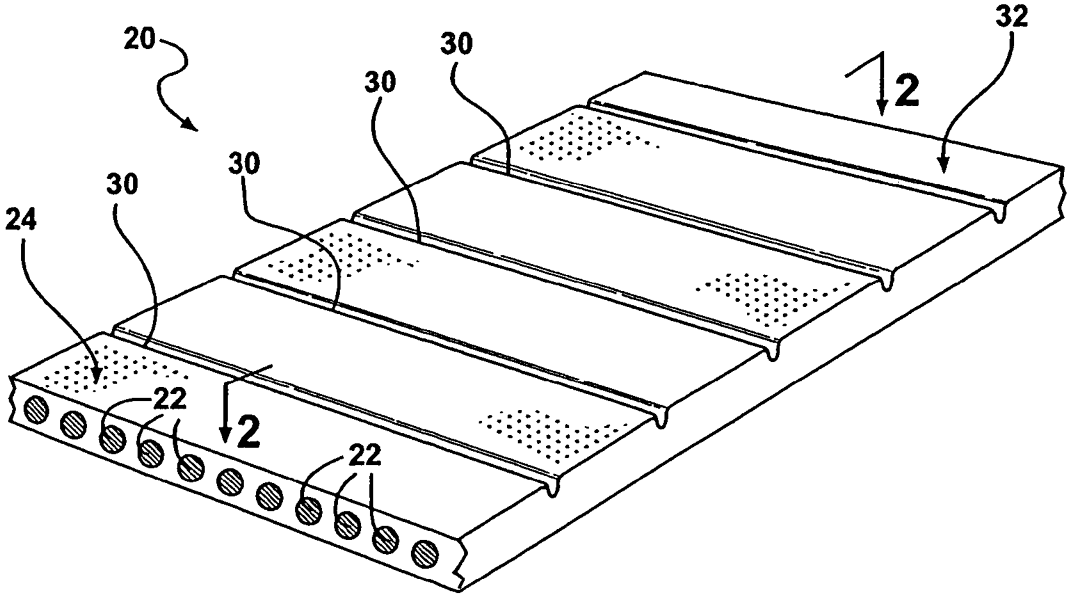
FIG - 1
FIG - 2
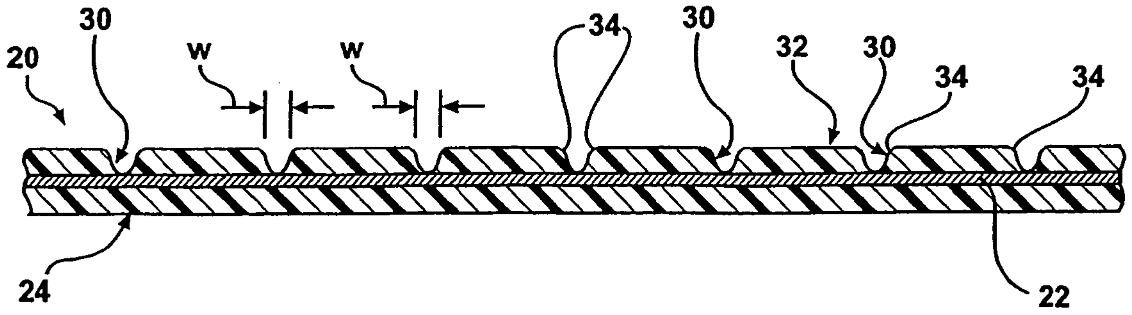

ELEVATOR SYSTEM DESIGN INCLUDING A BELT ASSEMBLY WITH A VIBRATION AND NOISE REDUCING GROOVE CONFIGURATION

This application claims priority to the International Application Number PCT/US03/01148, which was filed on 15 Jan. 2003, which claims priority to U.S. Provisional Application No. 60/349,057, which was filed on 16 Jan. 2002.

FIELD OF THE INVENTION

This invention generally relates to elevator system design. More particularly, this invention relates to an elevator system design strategy incorporating a belt assembly having a specialized groove configuration.

DESCRIPTION OF THE RELATED ART

Elevator systems typically include a cab and counterweight that move within a hoistway to transport passengers or cargo to different landings within a building, for example. A load bearing member, such as roping or a belt typically moves over a set of sheaves and supports the load of the cab and counterweight. There are a variety of types of load bearing members used in elevator systems.

One type of load bearing member is a coated steel belt. Typical arrangements include a plurality of steel cords extending along the length of the belt assembly. A jacket is applied over the cords and forms an exterior of the belt assembly. Some jacket application processes result in grooves being formed in the jacket surface on at least one side of the belt assembly. Some processes also tend to cause distortions or irregularities in the position of the steel cords relative to the exterior of the jacket along the length of the belt.

FIG. 6, for example, illustrates both of these phenomena. As can be seen, the spacing between the exterior of the jacket 200 and the cords 210 varies along the length of the belt. As can be appreciated from the illustration, the cords 210 are set within the jacket as if they comprise a series of cord segments of equal length corresponding to the groove spacing. The illustration of FIG. 6 includes an exaggeration of the typical physical cord layout for purposes of illustration. The actual distortions or changes in the position of the cords relative to the jacket outer surfaces may not be discernable by the human eye in some examples.

When conventional jacket application processes are used, the manner in which the cords are supported during the jacket application process tends to result in such distortion in the geometry or configuration of the cords relative to the jacket outer surfaces along the length of the belt.

While such arrangements have proven useful, there is need for improvement. One particular difficulty associated with such belt assemblies is that as the belt moves in the elevator system, the grooves and the cord placement in the jacket interact with other system components such as the sheaves and generate undesirable noise, vibration or both. For example, as the belt assembly moves at a constant velocity, a steady state frequency of groove contact with the sheaves creates an annoying, audible tone. The repeated pattern of changes in the cord spacing from the jacket outer surfaces is believed to contribute to such noise generation.

An alternative arrangement is required to minimize or eliminate the occurrence of vibrations or an annoying tone during elevator system operation. This invention addresses that need.

SUMMARY OF THE INVENTION

In general terms, this invention is an elevator system design including a belt having a plurality of grooves that have a configuration selected to minimize vibration and noise during elevator system operation.

An elevator system designed according to this invention includes a cab that carries passengers or cargo between landings within a building, for example. A belt supports the cab and facilitates movement of the cab. The belt has a plurality of spaced grooves on at least one side of the belt. At least one sheave over which the belt travels as the cab moves includes a diameter that is selected to have a relationship to the width of the grooves on the belt. The ratio of the groove width to the sheave diameter is chosen to be less than about 0.05.

In one example, the ratio between the groove width and the belt diameter is selected to be between about 0.001 and 0.015.

A method of designing an elevator system according to this invention includes selecting a diameter of at least the drive sheave that is responsible for moving the belt and cab within the hoistway. The width of the grooves is then selected such that a ratio of the groove width to the sheave diameter is less than about 0.05. The inventive belt assembly includes a plurality of cords extending generally parallel to a longitudinal axis of the belt. A jacket over the cords includes a plurality of grooves configured to minimize the occurrence of vibrations and noise during elevator operation.

In another example, the grooves have fillets near the sheave-engaging surface of the jacket. A radius of curvature of the fillets may be customized along with other system parameters to minimize vibrations and noise. In one example, the fillets have a radius of curvature between about 0.1 mm and about 0.5 mm.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 1 schematically illustrates a portion of an example belt assembly designed according to an embodiment of this invention.

FIG. 2 is a cross-sectional illustration taken along the lines 2-2 in FIG. 1.

DETAILED DESCRIPTION OF THE PREFERRED EMBODIMENTS

Figure 3:
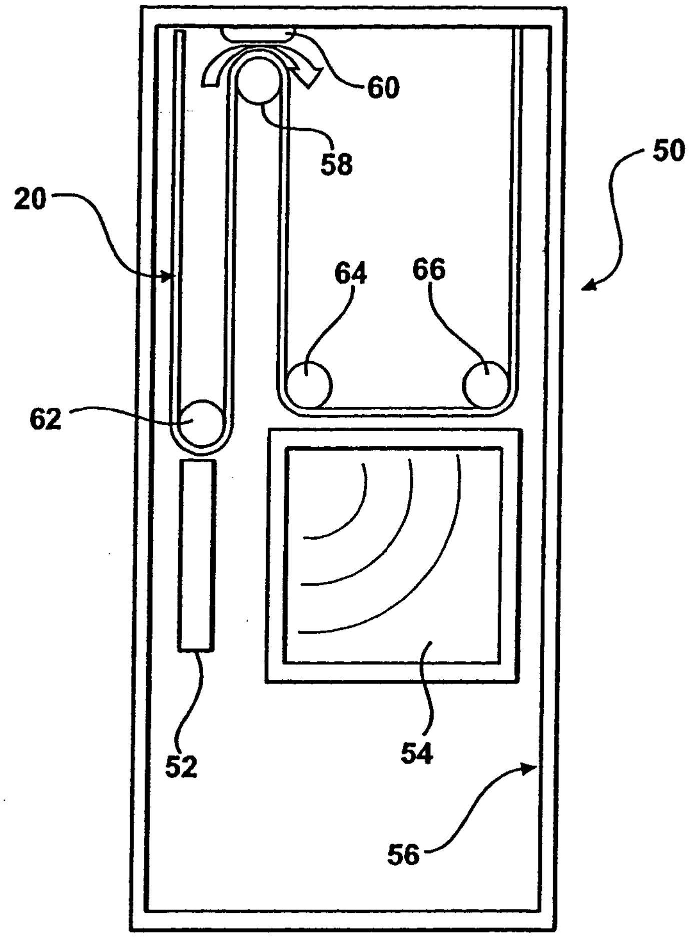
FIG. 3 is a schematic illustration of elevator system designed according to an embodiment of this invention.

FIGS. 1 and 2 schematically illustrate a belt assembly 20 that is designed for use in an elevator system. A plurality of cords 22 are aligned generally parallel to a longitudinal axis of the belt assembly 20. In one example, the cords 22 are made of strands of steel wire.

A jacket 24 covers over the cords 22. The jacket 24 preferably comprises a polyurethane-based material. A variety of such materials are commercially available and known in the art to be useful for elevator belt assemblies. Given this description, those skilled in the art will be able to select a proper jacket material to suit the needs of their particular situation.

The jacket 24 establishes an exterior width and thickness of the belt assembly 20. In one example, the width of the belt assembly is 30 millimeters and the thickness is 3 millimeters. In the same example, the cords 22 have a diameter of 1.65 millimeters. The cords 22 preferably extend along the entire length of the assembly.

The jacket 24 includes a plurality of grooves 30 on at least one side 32 of the jacket 24. In the illustrated example, the grooves extend across the entire width of the belt assembly.

The grooves result from some manufacturing processes, many of which are well known in the art, that are suitable for formation of the belt assembly 20. In the example embodiment of FIGS. 1 and 2, the grooves have a configuration that is useful for reducing vibrations during elevator system operation.

In the illustrated example, the groove configuration includes a rounded edge or fillet 34 at each end of each groove where the groove joins the side 32 of the exterior of the jacket. The fillets 34 differ from conventional groove designs where a sharp edge typically existed where the groove met with the exterior surface 32 of the jacket 24. A rounded fillet reduces noise and vibration as each groove contacts a sheave about which the belt wraps during elevator system operation.

The radius of curvature for each rounded edge or fillet 34 in the inventive arrangement preferably is selected to minimize the amount of vibration occurring from the interaction between the belt assembly 20 and other elevator system components. Various factors affecting the radius of curvature selection include the distance or spacing between the grooves 30, the width W of each groove, the stiffness characteristics of the jacket material and the thickness of the jacket material, which typically dictates the depth of each groove. In general, it is more preferable to have a larger radius of curvature, which tends to smooth out the transition between the side 32 of the jacket 24 and the grooves 30. A belt incorporating the inventive fillet design will include a fillet radius of curvature in the range from about 0.1 mm to about 0.5 mm. In one example, the radius of curvature for the fillets 34 is about 0.2 mm. In another example the radius is about 0.4 mm.

Another benefit of the fillet 34 is that it tends to reduce the sensitivity to shearing effects as the belt assembly 20 travels over the drive sheave 58. Because of the differing weights on the different sides of the drive sheave, a portion of the belt assembly 20 tends to be under greater load than the other portion on the opposite side of the drive sheave 58. This occurrence tends to introduce a shear effect on the jacket material 24. Incorporating fillets 34 on the groove 30 tends to reduce the sensitivity to this shearing effect and the contribution to vibration and noise generation during elevator system operation.

The width W of each groove 30 preferably is selected so that there is a relationship between the groove configuration and other components in the elevator system that provides optimal noise-reducing performance. FIG. 3 schematically illustrates an example elevator system 50 including an inventive belt assembly 20. Of course, there are other types of elevator system arrangements that include sheaves about which ropes or belts travel and this invention is not limited to the example system arrangement, which is schematically shown for discussion purposes. The elevator system 50 includes a conventional counterweight 52 and cab 54 that move through a hoistway 56 in a conventional manner. The belt assembly 20 is operative to support the loads of the counterweight 52 and cab 54 during system operation. The illustrated example includes a drive sheave 58 driven by a motor mechanism 60. Idle sheaves 62, 64 and 66 facilitate the desired movement of the cab 54 and counterweight 52 through the hoistway as needed to transport passengers or cargo between landings within a building, for example.

The groove width W preferably is selected to have a dimensional relationship with at least the diameter of the drive sheave 58 of the system 50. In some situations, all sheaves within the system 50 will have the same diameter while in others there may be sheaves of varying sizes within the system. At least the relationship between the groove width W and the size of the drive sheave (or sheaves, depending on the particular installation) is chosen to optimize the noise reducing properties of the belt assembly 20.

In general, a larger sheave diameter is preferred as the width W of the grooves 30 is increased. This invention includes the realization that relatively larger groove widths W compared to smaller sheave diameters tend to produce more vibration and noise generation than arrangements having a desirable dimensional relationship.

Figure 4:
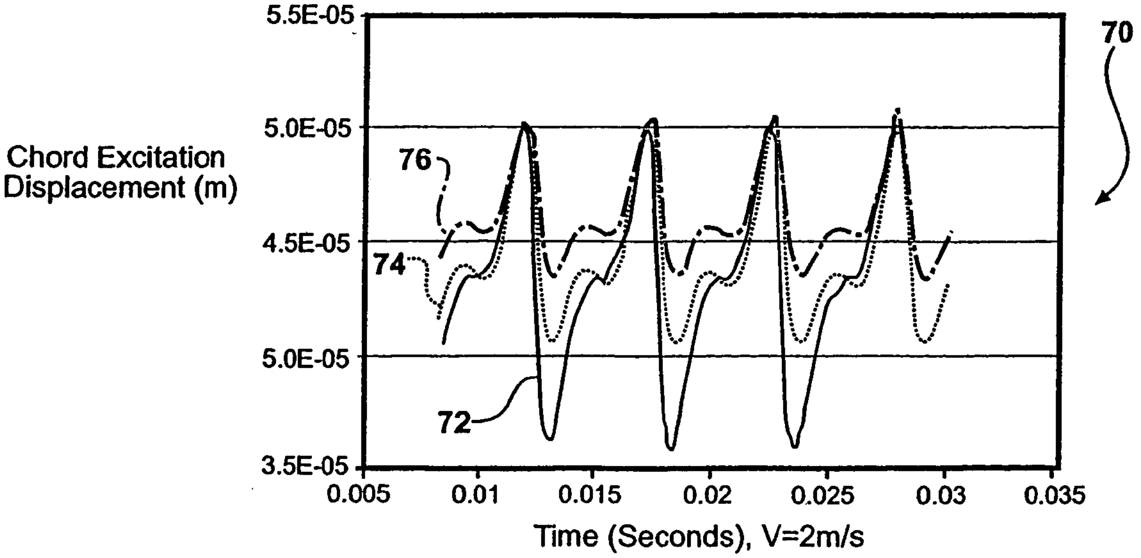
FIG. 4 graphically illustrates a feature of the inventive approach to elevator system design.

FIG. 4 graphically illustrates this phenomena in the graph 70. A first plot 72 shows the amount of vibration occurring in an example arrangement where the belt has dimensions consistent with the examples mentioned above. The amount of vibration occurring when the sheave diameter is 75 millimeters is shown in the plot 72. The plot 74 represents the amount of vibration occurring when the sheave diameter is increased to 100 millimeters. The plot at 76 shows the amount of vibration occurring when the sheave diameter is further increased to 125 millimeters. Given the peak-to-peak amplitude of each of the plots 72, 74 and 76, it is apparent that a larger sheave diameter for the given groove configuration and dimensions provides the least amount of vibration and, therefore, is the least likely to have noise generation during elevator system operation.

One factor that must be considered when selecting a sheave diameter and a groove width W is that a smaller sheave diameter may be preferred because it requires less torque and a less expensive machine including the motor mechanism 60. On the other hand, a larger sheave tends to increase the life of the belt assembly 20 and, according to this invention, tends to decrease the amount of vibration and noise generation during elevator system operation. Those skilled in the art who have the benefit of this description will be able to select appropriate dimensional relationships to meet the needs of their particular situation.

According to this invention, one preferred relationship between groove width W and sheave diameter preferably results in a ratio of the groove width W to the sheave diameter that is less than about 0.05. According to one example implementation of this invention, when the ratio exceeds 0.05, the amount of vibration is considered beyond an acceptable level. In another example, where the speed of elevator cab movement is lower, a higher ratio may be acceptable depending on the particular elevator system.

Figure 5:
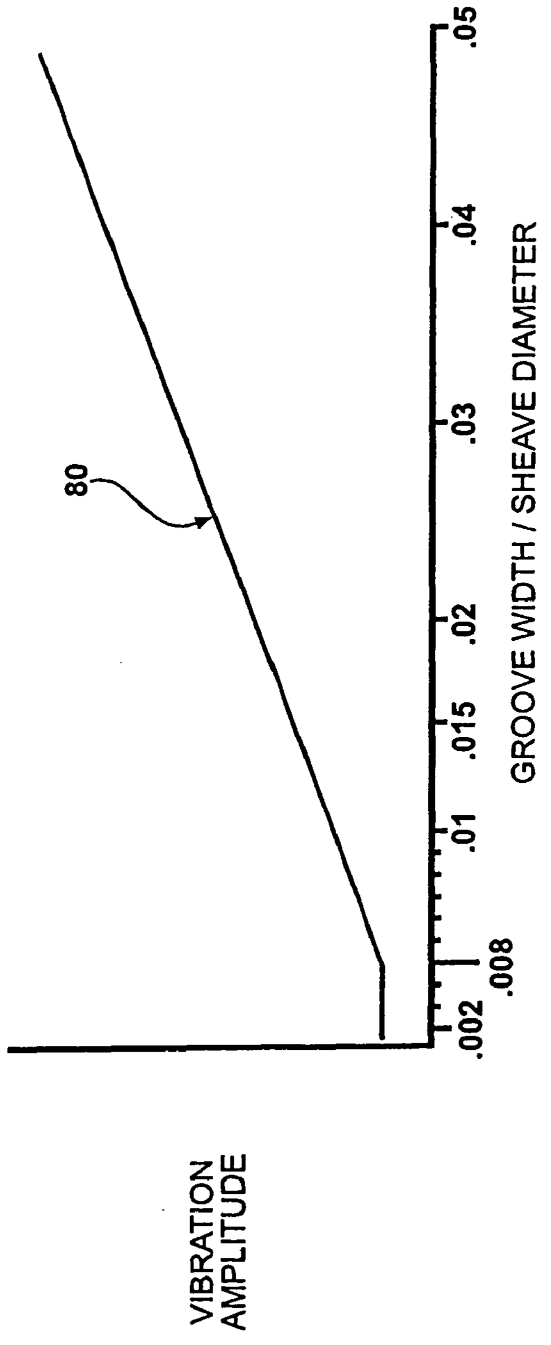
FIG. 5 graphically illustrates the vibration causing effects of a relationship between the dimensions of a groove width and sheave diameter.
Figure 6:
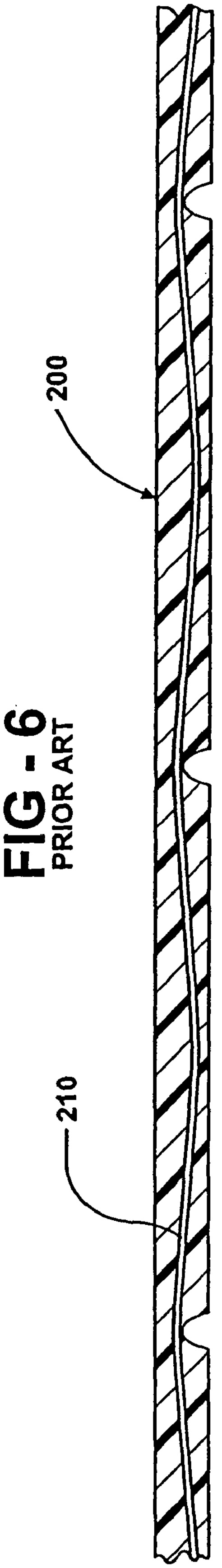
FIG - 6 PRIOR ART
FIG. 6 schematically shows a prior art belt.

As can be appreciated from FIG. 5, as the ratio of groove width to sheave diameter increases, the amount of vibration (and noise) increases. The plot 80 in FIG. 5 shows an amplitude of vibrations on the Y axis with the ratio of groove width to sheave diameter on the X axis. When the ratio is below 0.008, the amount of vibration is effectively the same and is considered acceptable in many situations because that level of vibration does not tend to generate any audible noise within the elevator system. As the ratio increases from 0.008 to 0.05, the amount of vibration increases in a generally linear fashion as can be appreciated from the plot.

One preferred range for the ratio of groove width to sheave diameter is below about 0.008. When the term "about" is used before a parameter in this description, it should be interpreted to include amounts varying by almost a full unit more or less within a factor of ten. For example, "about 0.008" should be interpreted to at least include a range from 0.0071 to 0.0089 and "about 0.05" should be interpreted to at least include a range from 0.041 to 0.059.

A variety of ranges may be used depending on the particulars of a given elevator system. Those skilled in the art who have the benefit of this description will be able to select the best ratio to meet the needs of their particular situation.

By combining the relationship between the groove width W and the size of the sheave (i.e., sheave diameter) and incorporating fillets 34 on the grooves 30, the inventive arrangement presents a substantial improvement in reducing vibration and noise generation during elevator system operation.

In some examples it is preferred to minimize the width of the grooves 30. There is, however, a point where the width of the groove 30 cannot become any smaller because of manufacturing tolerances. This tolerance will vary depending on the particular material selected to form the jacket 24 and the tooling used in the manufacturing process.

Additionally, it is believed that below a certain width, the noise reducing benefits of the inventive arrangement are not increased, as can be appreciated from FIG. 5.

The particular width of each groove 30 that provides optimal noise reducing performance may also vary depending on other characteristics of a particular elevator system, including overall belt assembly size and sheave diameter, for example. The speed of movement of the belt assembly 20 within the elevator system is another factor that affects the optimally selected groove width W. In general, according to this invention it is preferred to utilize ratios of groove width to sheave diameter in lower ranges for higher speed elevator systems compared to those of lower speeds. In other words, as elevator speed increases, the preferred ratio of groove width to sheave diameter decreases. Likewise, as elevator speed decreases, the acceptable range of ratios of groove width to sheave diameter increases. Those skilled in the art who have the benefit of this description will be able to select appropriate groove width W and sheave diameter(s) to optimize the noise reducing characteristics within a particular installation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:

a cab that moves at a elevator speed;

a belt that supports the cab and facilitates movement of the cab, the belt having a plurality of spaced grooves on at least one side of the belt, each of the grooves including a fillet at an edge of each groove; and at least one sheave over which the belt travels as the cab moves, the sheave having a diameter that has a relationship to a width of the grooves on the belt so that a ratio of the groove width to the sheave diameter is less than about 0.015, wherein the ratio of the groove width to the sheave diameter is (i) within a first range when the elevator speed is above a first speed and (ii) within a second, higher range when the elevator speed is a second, slower speed below the first speed.

2. The system of claim 1, wherein the ratio is less than about 0.008.

3. The system of claim 1, wherein the ratio is between 0.001 and 0.015.

4. The system of claim 1, wherein the fillets each have a radius of curvature that is between about 0.1 mm and about 0.5 mm.

* * * * *